US012776503B2

(12) United States Patent
Yeo

(10) Patent No.: US 12,776,503 B2
(45) Date of Patent: Oct. 27, 2026

(54) FUEL CELL SYSTEM

(71) Applicant: Youngchan Yeo, Seoul (KR)

(72) Inventor: Youngchan Yeo, Seoul (KR)

( * ) Notice: Subject to any disclaimer, the term of this patent is extended or adjusted under 35 U.S.C. 154(b) by 769 days.

(21) Appl. No.: 17/924,671

(22) PCT Filed: Dec. 24, 2020

(86) PCT No.: PCT/KR2020/019138
§ 371 (c)(1),
(2) Date: Nov. 10, 2022

(87) PCT Pub. No.: WO2021/230456
PCT Pub. Date: Nov. 18, 2021

(65) Prior Publication Data
US 2023/0197991 A1 Jun. 22, 2023

(30) Foreign Application Priority Data
May 11, 2020 (KR) ........................ 10-2020-0055684

(51) Int. Cl.
*H01M 8/0612* (2016.01)
*F24D 19/10* (2006.01)
(Continued)

(52) U.S. Cl.
CPC .......... *H01M 8/0618* (2013.01); *F24D 19/10* (2013.01); *F24H 15/16* (2022.01); *F24H 15/174* (2022.01);
(Continued)

(58) Field of Classification Search
CPC ...... F24D 18/00; F24D 19/10; F24D 2101/30; F24D 2103/17; F24D 2103/20;
(Continued)

(56) References Cited

U.S. PATENT DOCUMENTS

2010/0292856 A1* 11/2010 Fujita ..................... G06Q 10/04
705/412

FOREIGN PATENT DOCUMENTS

JP 2003020203 A * 1/2003
JP 2003164063 A * 6/2003
(Continued)

OTHER PUBLICATIONS

JP2003164063A, Maeda, et al. "", machine English translation retrieved from https://worldwide.espacenet.com/ Date: Jul. 22, 2025 (Year: 2003).*

(Continued)

*Primary Examiner* — Tiffany Legette
*Assistant Examiner* — Jared Hansen
(74) *Attorney, Agent, or Firm* — Maschoff Brennan

(57) ABSTRACT

Provided is a fuel cell system. The fuel cell system comprises: a reformer that reforms fuel; a reformed fuel storage unit that receives the reformed fuel from the reformer and stores same; a fuel cell stack that generates electric power and heat by using the reformed fuel; a boiler unit that provides heating by using heating water, a battery unit that stores the electric power generated in the fuel cell stack; and a control unit that controls the operations of the reformer, the reformed fuel storage unit, the fuel cell stack, the boiler unit, and the battery unit, wherein the control unit controls the reformer to operate using the heating water of the boiler unit when the temperature of the heating water of the boiler unit is higher than a first baseline and the stored amount of the reformed fuel stored in the reformed fuel storage unit is equal to or less than a second baseline.

10 Claims, 6 Drawing Sheets

(51) Int. Cl.

| | |
|---|---|
| ***F24H 15/16*** | (2022.01) |
| ***F24H 15/174*** | (2022.01) |
| ***F24H 15/212*** | (2022.01) |
| ***F24H 15/296*** | (2022.01) |
| ***H01M 8/04007*** | (2016.01) |
| ***H01M 8/04701*** | (2016.01) |
| ***H01M 8/1018*** | (2016.01) |

(52) U.S. Cl.

CPC ......... *F24H 15/212* (2022.01); *F24H 15/296* (2022.01); *H01M 8/04007* (2013.01); *H01M 8/04738* (2013.01); *H01M 8/1018* (2013.01); *H01M 2220/10* (2013.01); *H01M 2250/405* (2013.01)

(58) Field of Classification Search

CPC ...... F24H 15/16; F24H 15/156; F24H 15/174; F24H 15/212; F24H 15/223; F24H 15/296; F24H 15/355; F24H 2240/01; F24H 2240/10; H01M 8/04007; H01M 8/04029; H01M 8/04201; H01M 8/04373; H01M 8/04425; H01M 8/04738; H01M 8/04776; H01M 8/0618; H01M 8/1018; H01M 10/48; H01M 10/425; H01M 16/006; H01M 2220/10; H01M 2250/405; Y02B 10/70; Y02E 40/70; Y02E 60/50; Y04S 10/50

See application file for complete search history.

(56) References Cited

FOREIGN PATENT DOCUMENTS

| | | | | |
|---|---|---|---|---|
| JP | 2012038474 | A | * | 2/2012 |
| KR | 10-2007-0099702 | A | | 10/2007 |
| KR | 10-0778626 | B1 | | 11/2007 |
| KR | 10-0892160 | B1 | | 4/2009 |
| KR | 20130091844 | A | | 8/2013 |
| KR | 10-2014-0092481 | A | | 7/2014 |
| WO | 2014-142387 | A1 | | 9/2014 |
| WO | 2016075725 | A1 | | 5/2016 |

OTHER PUBLICATIONS

JP2012038474A, Hiwatari, et al. "", machine English translation retrieved from https://worldwide.espacenet.com/ Date: Jul. 22, 2025 (Year: 2012).*

JP2003020203A, Takimoto, et al. "Fuel reformer and start-up method thereof", machine English translation retrieved from https://worldwide.espacenet.com/ Date: Mar. 24, 2026 (Year: 2003).*

* cited by examiner

[FIG. 1]
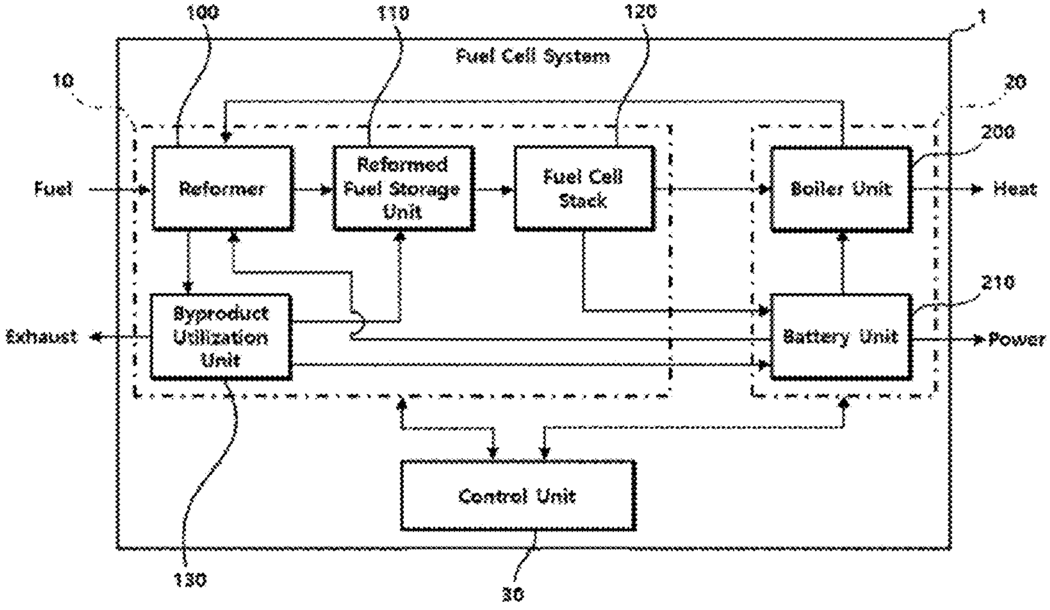

[FIG. 2]
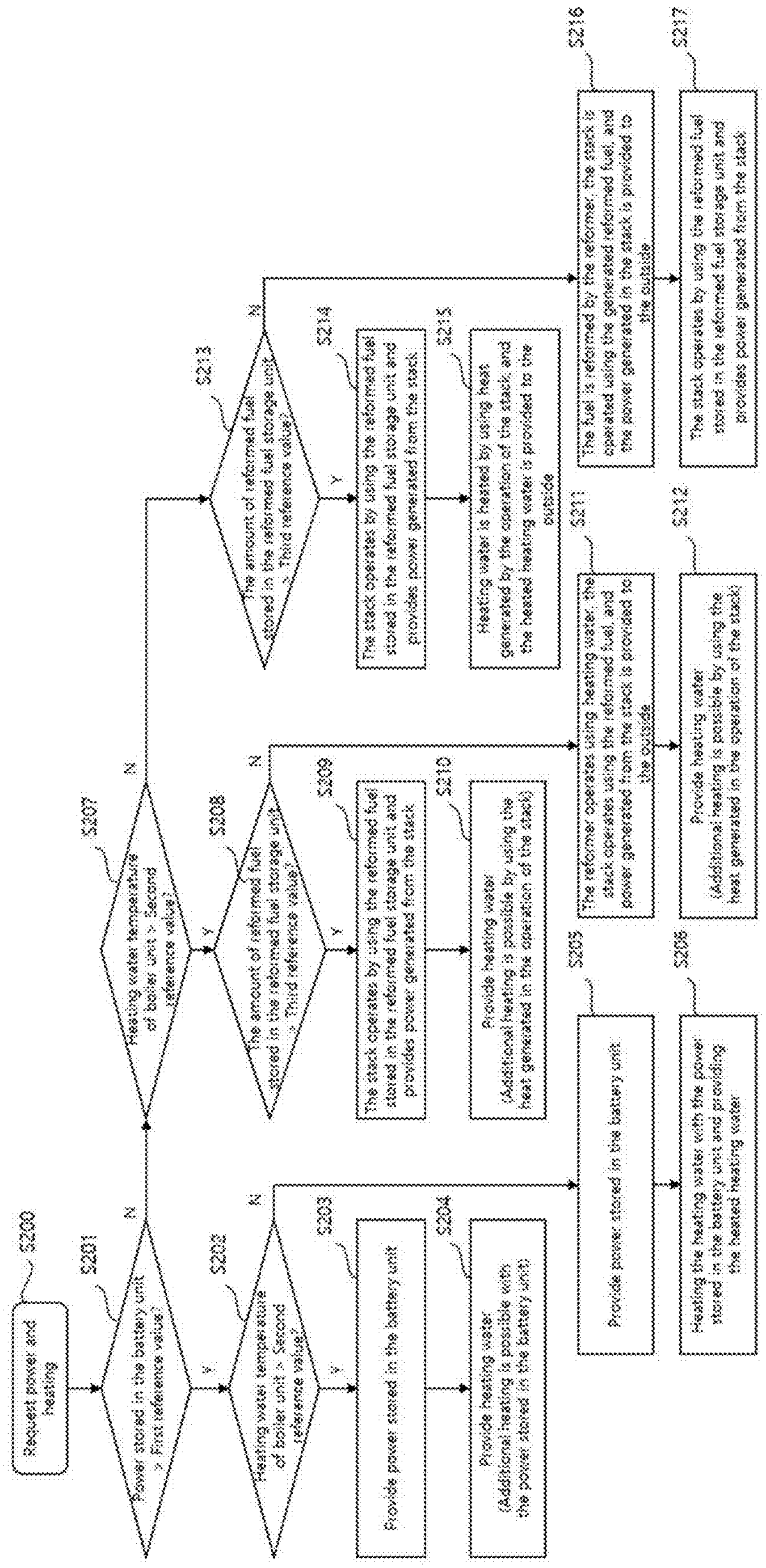

[FIG. 3]
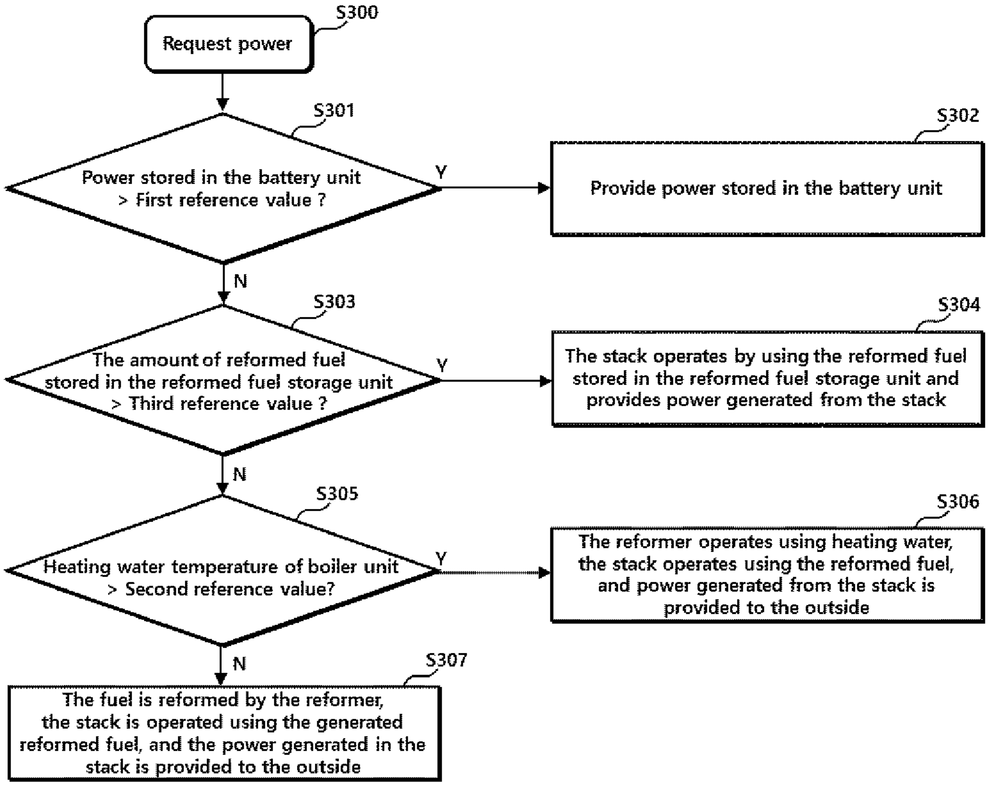

[FIG. 4]
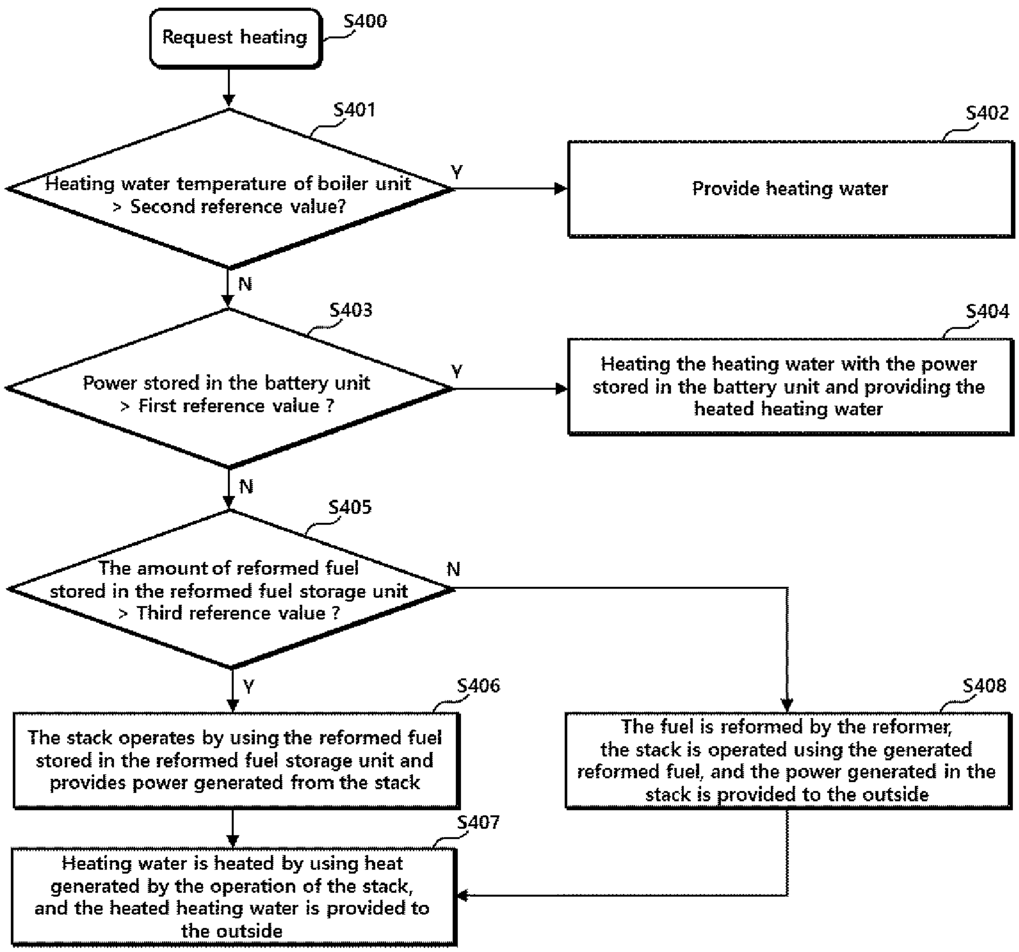

[FIG. 5]
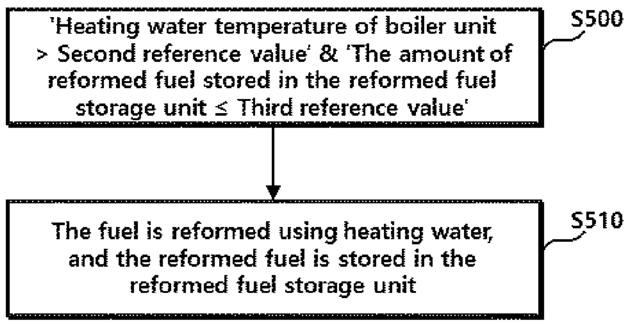
[FIG. 6]
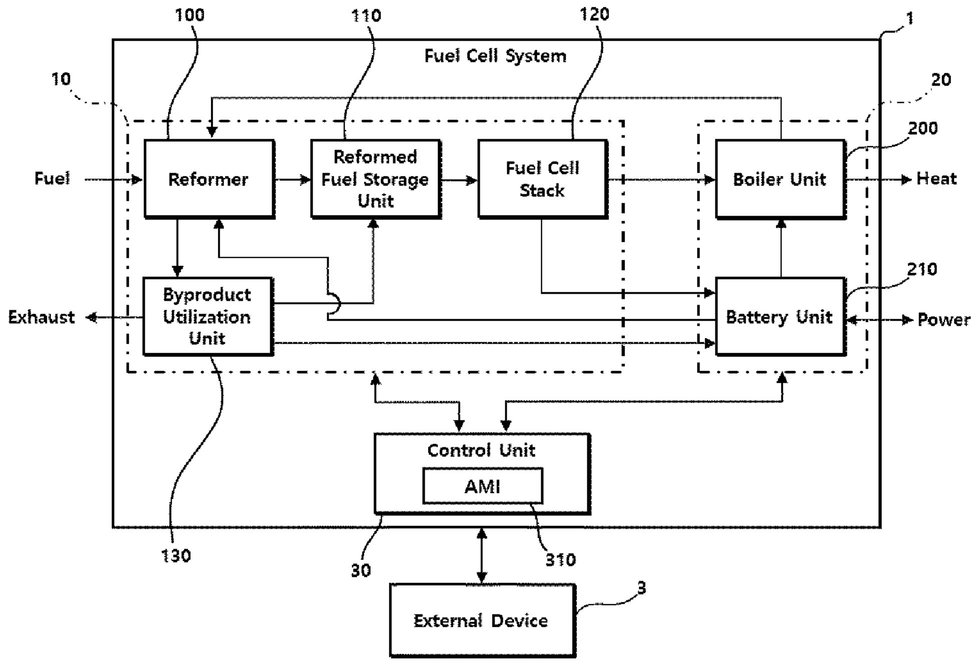

[FIG. 7]
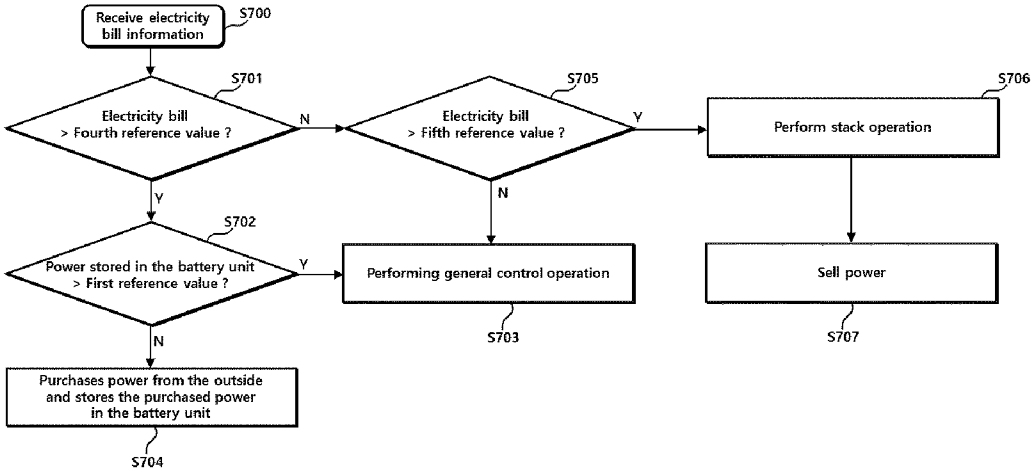
[FIG. 8]
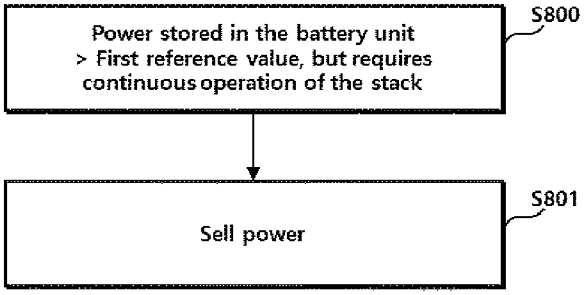

FUEL CELL SYSTEM

FIELD OF INVENTION

The present invention relates a fuel cell system.

BACKGROUND OF INVENTION

In general, a low-temperature fuel cell system such as a polymer electrolyte fuel cell (PEMFC) is used in houses or buildings. The low-temperature fuel cell includes a reformer and a fuel cell stack. The reformer is used to reform city gas (Liquefied Natural Gas; LNG) into hydrogen gas, while the fuel cell stack generates electric power (often referred to as "power") and heat using the hydrogen gas and air. The power generated by the fuel cell stack is supplied to houses or buildings, and is used as a power source. Further, the heat generated by the fuel cell stack is supplied to heat houses and buildings.

In the present fuel cell system, both the reformer and the fuel cell stack must be operated to provide any one of electric power and heating. However, the power and heating are not always required in houses or buildings at the same time and, in the case where any one of the power and heating is required in the houses or buildings, there is a problem in that the other energy is unnecessarily generated and consumed.

SUMMARY OF INVENTION

Technical Problem to be Solved

A technical problem to be solved by the present invention, that is, an object of the present invention is to provide a fuel cell system with improved energy efficiency by independently operating a reformer and a fuel cell stack, respectively.

Another object of the present invention is to provide a fuel cell system that minimizes thermal energy loss.

A further object of the present invention is to provide a fuel cell system capable of maximizing profits by establishing a power trading strategy.

Technical tasks of the present invention are not particularly limited to the objects described above, and other objects not mentioned herein will be clearly understood by those skilled in the art from the following description.

Technical Solution

A fuel cell system according to some embodiments of the present invention to achieve the above objects may include: a reformer for reforming fuel; a reformed fuel storage unit to receive and store the reformed fuel from the reformer; a fuel cell stack to generate electric power and heat using the reformed fuel; a boiler unit to provide heating using the heating water; a battery unit that stores the power generated from the fuel cell stack; and a control unit that controls operations of the reformer, the reformer fuel storage unit, the fuel cell stack, the boiler unit and the battery unit wherein, when a temperature of the heating water in the boiler unit is higher than a baseline and a storage amount of the reformed fuel in the reformed fuel storage unit is equal to or less than the baseline, the control unit controls the reformer to be operated using the heating water in the boiler unit.

In some embodiments, when the supply of electric power to the outside is required, the storage amount of the reformed fuel in the reformed fuel storage unit is equal to or less than the baseline, and an amount of electric power in the battery unit is equal to or less than the baseline, the control unit may control the reformer to be operated in order to generate reformed fuel, and may further control the fuel cell stack to be operated using the reformed fuel.

In some embodiments, when the supply of electric power to the outside is required, the storage amount of the reformed fuel in the reformed fuel storage unit is greater than the baseline, and the amount of power in the battery unit is equal to or less than the baseline, the control unit may control the reformer to be inoperative and may further control the fuel cell stack to be operated using the reformed fuel stored in the reformed fuel storage unit.

In some embodiments, when the supply of electric power to the outside is required and the amount of power in the battery unit is greater than the baseline, the control unit may control the power stored in the battery unit to be supplied the outside.

In some embodiments, when heating of the outside is required, a temperature of the heating water in the boiler unit is equal to or less than the baseline, and the amount of power in the battery unit is greater than the baseline, the control unit may control heating of the heating water in the boiler unit using the power stored in the battery unit.

In some embodiments, when heating of the outside is required, a temperature of the heating water in the boiler unit is equal to or less than the baseline, and the amount of powder in the battery unit is equal to or less than the baseline, the control unit may control the operation of the fuel cell stack and may further control heating of the heating water in the boiler unit using the heat generated in the fuel cell stack.

In some embodiments, when the storage amount of the reformed fuel in the reformed fuel storage unit is equal to or less than the baseline, the control unit may control the reformer to be operated.

In some embodiments, when the storage amount of the reformed fuel in the reformed fuel storage unit is greater than the baseline, the control unit may control the reformer to be inoperative and may also control the fuel cell stack to be operated using the reformed fuel stored in the reformed fuel storage unit.

In some embodiments, the control unit may include a bidirectional Advanced Metering Infrastructure (AMI) and, when a power rate (electric charge) received through the bidirectional AMI is greater than a baseline, the control unit may control the fuel cell stack to be operated and may also control the operation to supply the power generated in the fuel cell stack to the outside.

In some embodiments, the control unit may include a bidirectional Advanced metering infrastructure (AMI) and, when the power rate received through the bidirectional AMI is equal to or less than a baseline, the control unit may control the operation to receive electric power supplied from the outside and then storage thereof in the battery unit.

In some embodiments, when the power of the battery unit is greater than the baseline and the fuel cell stack is operating, the control unit may control the operation to supply the power generated by the fuel cell stack to the outside.

Specific details of other embodiments are included in the detailed description and drawings.

Effect of Invention

The fuel cell system according to some embodiments of the present invention may minimize the loss of thermal energy by independently operating the reformer and the fuel cell stack, thereby improving energy efficiency.

Further, the fuel cell system according to some embodiments of the present invention may maximize profits by establishing a power trading strategy.

Effects of the present invention are not limited to the effects mentioned above, and other effects not mentioned herein will be clearly understood by those skilled in the art from the description of the claims.

BRIEF DESCRIPTION OF DRAWINGS

FIG. 1 is an exemplary view for explain a fuel cell system according to some embodiments of the present invention.

FIGS. 2 to 5 are exemplary views for explaining the operation of the fuel cell system according to some embodiments of the present invention.

FIG. 6 is an exemplary view for explaining a fuel cell system according to some embodiments of the present invention.

FIGS. 7 and 8 are exemplary views for explaining a method of operating the fuel cell system according to some embodiments of the present invention.

DETAILED DESCRIPTION OF PREFERRED EMBODIMENTS OF INVENTION

Advantages and features of the present invention and methods of achieving the same will become apparent with reference to the embodiments described below in detail in conjunction with the accompanying drawings. However, the present invention is not limited to the embodiments disclosed below but will be implemented in a variety of different forms. Only these embodiments allow the disclosure of the present invention to be complete and are provided to fully inform persons having ordinary knowledge in the technical field to which the present invention pertains ("those skilled in the art") the scope of the invention, while the present invention is only defined by the scope of the claims. Dimensions and relative sizes of components indicated in the drawings may be exaggerated for clarity of description. The same reference numerals refer to the same elements throughout, and "and/or" includes each and every combination of one or more of the recited items.

The terminology used herein is for the purpose of describing the embodiments and is not intended to limit the present invention. As used herein, the singular also includes the plural unless specifically stated otherwise in the phrase. As used herein, "includes" and/or "including" does not exclude the presence or addition of one or more other components in addition to the stated components.

Although the first, second, etc. are used to describe various elements or components, these elements or components are of course not limited by these terms. These terms are only used to distinguish one element or component from another. Accordingly, it goes without saying that the first element or component mentioned below may be the second element or component within the spirit of the present invention.

Unless otherwise defined, all terms (including technical and scientific terms) used herein may be used with the meanings commonly understood by those skilled in the art to which the present invention pertains. Further, terms defined in any commonly used dictionary are not to be interpreted ideally or excessively unless clearly and specifically defined.

FIG. 1 is an exemplary view for explaining a fuel cell system 1 according to some embodiments of the present invention. The fuel cell system 1 according to some embodiments of the present invention may be a low-temperature fuel cell system. For example, the fuel cell system 1 according to some embodiments of the present invention may be a polymer electrolyte fuel cell (PEMFC), but the embodiments are not limited thereto.

Referring to FIG. 1, a fuel cell system 1 according to some embodiments of the present invention may include an energy generating unit 10, an energy supplying unit 20 and a control unit 30. The energy generating unit 10 may include a reformer 100, a reformed fuel storage unit 110, a fuel cell stack 120, and a by-product utilization unit 130. Further, the energy providing unit 20 may include a boiler unit 200 and a battery unit 210.

The reformer 100 may receive fuel from the outside. The reformer 100 may reform fuel provided from the outside to generate a reformed fuel and a reformed by-product. The reformed fuel generated in the reformer 100 may be provided to the reformed fuel storage unit 110. Also, the reformed by-product generated in the reformer 100 may be provided to the by-product utilization unit 130.

For example, the fuel provided from the outside may include methane ($CH_4$) gas. Further, the reformer 100 may generate hydrogen ($H_2$) and carbon dioxide ($CO_2$) using methane ($CH_4$) gas and water ($H_2O$). In this case, the generated hydrogen ($H_2$) may be provided to the reformed fuel storage unit 110 as a reformed fuel, and the generated carbon dioxide ($CO_2$) may be provided to the by-product utilization unit 130 as a reformed by-product. However, this is only an example, and the embodiments are not limited thereto.

The reformed fuel storage unit 110 may receive the reformed fuel from the reformer 100. The reformed fuel storage unit 110 may store the reformed fuel. The reformed fuel storage unit 110 may store the reformed fuel in any one of a gas phase, a liquid phase and a solid phase. For example, the reformed fuel storage unit 110 may receive hydrogen ($H_2$) as a reformed fuel from the reformer 100 and store the hydrogen ($H_2$) in the form of metal hydride. In this case, the reformed fuel storage unit 110 may further include a temperature and pressure regulator between the reformer 100 and the metal hydride for effective storage of hydrogen ($H_2$). The temperature and pressure regulator may control the storage and release of hydrogen ($H_2$) gas by appropriately adjusting the temperature and pressure of the metal hydride. As the temperature and pressure regulator, for example, a screw type compressor may be used, but, the embodiments of the present invention are not limited thereto. The reformed fuel storage unit 110 may provide the stored reformed fuel to the fuel cell stack 120.

The fuel cell stack 120 may receive the reformed fuel from the reformed fuel storage unit 110. The fuel cell stack 120 may generate power using the reformed fuel and air (e.g., oxygen ($O_2$)). When the fuel cell stack 120 generates electric power using the reformed fuel, heat may also be generated due to an internal chemical reaction. In other words, the fuel cell stack 120 may generate power and heat using the reformed fuel. The power generated by the fuel cell stack 120 may be supplied to the battery unit 210. For example, electric power generated in the fuel cell stack 120 may be stored in a storage battery (or "capacitor") in the battery unit 210.

Further, heat generated in the fuel cell stack 120 may be supplied to the boiler unit 200. For example, heat generated in the fuel cell stack 120 may be supplied to the heating water of the boiler unit 200. The heating water refers to water fed from the boiler unit 200 to the outside of the fuel cell system 1 for the provision of heating.

For example, heat generated in the fuel cell stack 120 may be supplied to a coolant flowing in the fuel cell stack 120. Since the coolant of the fuel cell stack 120 absorbs heat generated in the fuel cell stack 120, the temperature may increase. The coolant having increased temperature may exchange heat with the heating water of the boiler unit 200 through a heat exchanger. That is, the increased temperature of the coolant may be decreased because it supplies heat to the heating water through the heat exchanger, and the temperature of the heating water may be increased because the heating water absorbs heat from the coolant with increased temperature through the heat exchanger. In other words, the heat generated in the fuel cell stack 120 may be used to heat the heating water of the boiler unit 200 through the heat exchanger.

As another example, the coolant of the fuel cell stack 120 may be directly fed to the boiler unit 200 in order to be used as the heating water. In other words, the coolant flowing in the fuel cell stack 120 absorbs heat generated in the fuel cell stack 120 so as to increase the temperature, and the coolant having increased temperature may be fed to the boiler unit 200, thereby being directly used as the heating water. In other words, the heat generated in the fuel cell stack 120 may be used to directly heat the heating water of the boiler unit 200. Eventually, the heat generated in the fuel cell stack 120 may be supplied to the heating water of the boiler unit 200.

According to some embodiments of the present invention, the reformer 100 may receive heat from the boiler unit 200. For example, the reformer 100 may directly receive the heating water from the boiler unit 200. As another example, the reformer 100 may receive heat from the heating water of the boiler unit 200 through a heat exchanger. A detailed description will be given later.

The boiler unit 200 may provide heating to the outside of the fuel cell system 1. For example, the boiler unit 200 may provide heating to a building or the like. That is, the boiler unit 200 may provide heating by supplying the heating water having increased temperature to a building or the like.

The battery unit 210 may supply electric power to the outside of the fuel cell system 1. For example, the battery unit 210 may supply the power stored in a capacitor of the battery unit 210 to a building or the like. According to some embodiments of the present invention, the battery unit 210 may include a capacitor, a battery management system (BMS), a power conditioning system (PCS), and the like, but the embodiments are not limited thereto.

According to some embodiments of the present invention, the power stored in the battery unit 210 may be used to increase a temperature of the heating water in the boiler unit 200. A detailed description will be given later.

The by-product utilization unit 130 may use the reformed by-product generated in the reformer 100. According to some embodiments of the present invention, the by-product utilization unit 130 may generate a reformed fuel and electric power using at least a portion of the reformed by-product. Reformed by-products not used in the by-product utilization unit 130 may be discharged through an exhaust port. The exhaust port may be exposed to the outside and may be connected to a device to further process the reformed by-product.

For example, the by-product utilization unit 130 may dissolve carbon dioxide ($CO_2$) as the reformed by-product in liquid water ($H_2O$) to generate hydrogen ions ($H^+$) and hydrogen carbonate ions ($HCO3^-$). Reducing hydrogen ions ($H^+$) may generate hydrogen gas ($H_2$) as the reformed fuel. In the process of reducing hydrogen ions ($H^+$), a flow of electrons (i.e., electric current) may be generated. In other words, the by-product utilization unit 130 may generate hydrogen gas ($H_2$) and electric power as a reformed fuel using carbon dioxide ($CO_2$), which is a reformed by-product. The reformed fuel generated by the by-product utilization unit 130 may be provided to the reformed fuel storage unit 110. Further, the power generated by the by-product utilization unit 130 may be supplied to the battery unit 210.

Although not shown, the by-product utilization unit 130 may include a by-product processing unit and a by-product storage unit. According to some embodiments of the present invention, the by-product processing unit may use a portion of the reformed by-product to generate the reformed fuel and electric power, and the by-product storage unit may store the remaining reformed by-product not used in the by-product processing unit. When the reformed by-product is stored in the by-product storage unit over a certain level, the by-product utilization unit 130 may discharge the reformed by-product to the exhaust port.

According to some embodiments of the present disclosure, the control unit 30 may control overall operation of the energy generating unit 10 and the energy supplying unit 20. In other words, the control unit 30 may control the overall operation of the reformer 100, the reformed fuel storage unit 110, the fuel cell stack 120, the by-product utilization unit 130, the boiler unit 200 and the battery unit 210.

FIG. 1 illustrates a reference view to explain some embodiments of the present invention. Further, in implementing the fuel cell system 1 according to some embodiments of the present invention, all of the components shown in FIG. 1 are not necessarily provided. Further, it needs not to be configured with only the components shown in FIG. 1. In other words, those skilled in the art may omit some of the components shown in FIG. 1 or add other components not shown in FIG. 1. For example, the fuel cell system 1 according to some embodiments of the present invention may be configured by omitting the by-product utilization unit 130.

FIG. 2 is an exemplary view for explaining the operation of the fuel cell system 1 according to some embodiments of the present invention. An operation of the fuel cell system 1 in the case where electric power and heating are requested from the outside of the fuel cell system 1 (e.g., a building) will be described with reference to FIGS. 1 and 2.

When the supply of power and heating is requested from the outside of the fuel cell system 1 (S200), the control unit 30 may determine whether the power stored in the battery unit 210 exceeds a first baseline (S201). The first baseline may be set by the user of the fuel cell system 1 as needed, or may be a value previously set by the establisher of the fuel cell system 1. In other words, the control unit 30 may check whether the amount of power charged in the battery unit 210 is greater than the first baseline.

When the power stored in the battery unit 210 is greater than the first baseline (S201, Y), the control unit 30 may determine whether the heating water temperature of the boiler unit 200 exceeds a second baseline (S202). The second baseline may be set by the user of the fuel cell system 1 as needed, or may be a value previously set by the establisher of the fuel cell system 1.

When the heating water temperature of the boiler unit 200 exceeds the second baseline (S202, Y), the control unit 30 may supply the power stored in the battery unit 210 to the outside of the fuel cell system 1 (S203). Further, the control unit 30 may supply the heating water of the boiler unit 200 having a temperature greater than the second baseline to the outside of the fuel cell system 1 (S204). In other words, when the power of the battery unit 210 is greater than the first baseline and the heating water temperature of the boiler unit 200 is greater than a second baseline, the control unit 30 may supply electric power and provide heating to the outside of the fuel cell system 1 even without operating the fuel cell stack 120.

In some embodiments, even when the heating water temperature of the boiler unit 200 exceeds the second baseline, the control unit 30 may further heat the heating water of the boiler unit 200 using the power stored in the battery unit 210 and then provide the heated heating water to the outside of the fuel cell system 1.

When the heating water temperature of the boiler unit 200 is equal to or less than the second baseline (S202, N), the control unit 30 may supply the power stored in the battery unit 210 to the outside of the fuel cell system 1 (S205). Further, the control unit 30 may heat the heating water of the boiler unit 200 using the power stored in the battery unit 210. The control unit 30 may provide the heating water of the boiler unit 200 heated by the power stored in the battery unit 210 to the outside of the fuel cell system 1 (S206). In other words, when the power of the battery unit 210 is greater than the first baseline and the heating water temperature of the boiler unit 200 is equal to or less than the second baseline, the control unit 30 may supply electric power and provide heating to the outside of the fuel cell system 1 using only the power stored in the battery unit 210 even without operating the fuel cell stack 120.

When the power stored in the battery unit 210 is equal to or less than the first baseline (S201, N), the control unit 30 may determine whether the heating water temperature of the boiler unit 200 exceeds the second baseline (S207). When the heating water temperature of the boiler unit 200 exceeds the second baseline (S207, Y), the control unit 30 may determine whether the storage amount of the reformed fuel in the reformed fuel storage unit 110 exceeds a third baseline or not (S208). The third baseline may be set by the user of the fuel cell system 1 as needed, or may be a value previously set by the establisher of the fuel cell system 1.

According to some embodiments, the operation of the reformer 100 and the operation of the fuel cell stack 120 may be controlled independently of each other. When the storage amount of the reformed fuel in the reformed fuel storage unit 110 exceeds the third baseline (S208, Y), the control unit 30 may control the fuel cell stack 120 to be operated only using the reformed fuel stored in the reformed fuel storage unit 110 without operating the reformer 100. In other words, the control unit 30 may control the operation to provide the reformed fuel stored in the reformed fuel storage unit 110 to the fuel cell stack 120 without the operation of the reformer 100, and may further control the fuel cell stack 120 to be operated using the reformed fuel provided from the reformed fuel storage unit 110. The fuel cell stack 120 may generate electric power using the reformed fuel, while the control unit 30 may supply the power generated in the fuel cell stack 120 to the outside of the fuel cell system 1 (S209). For example, the control unit 30 may control the operation to directly supply the power generated by the fuel cell stack 120 to the outside of the fuel cell system 1 through a power conversion device or the like. For another example, the power generated by the fuel cell stack 120 may be stored in the battery unit 210, while the control unit 30 may control the battery unit 210 to supply electric power to the outside.

Since the heating water temperature of the boiler unit 200 exceeds the second baseline, the control unit 30 may supply the heating water of the boiler unit 200 to the outside of the fuel cell system 1. The control unit 30 may provide heating by supplying the heating water of the boiler unit 200 to the outside of the fuel cell system 1 (S210). In some embodiments, even when the heating water temperature of the boiler unit 200 exceeds the second baseline, the control unit 30 may further heat the heating water using the heat generated during the operation of the fuel cell stack 120, and the heated heating water may be supplied to the outside of the fuel cell system 1. However, the embodiments are not limited thereto, but it is of course that the control unit 30 may supply the heating water of the boiler unit 200 to the outside of the fuel cell system 1 without additional heating of the heating water of the boiler unit 200.

When the storage amount of the reformed fuel in the reformed fuel storage unit 110 is equal to or less than the third baseline (S208, N), it may need to operate the reformer 100. In this case, since the heating water temperature of the boiler unit 200 exceeds the second baseline, the control unit 30 may control the reformer 100 to be operated using the heating water of the boiler unit 200.

The reformer 100 may require fuel and a gas-phase water (i.e., water vapor) when reforming the fuel. In order to conduct a phase change of liquid water into gaseous water, it is necessary to supply thermal energy to the liquid water. According to some embodiments, the control unit 30 may heat and vaporize the liquid water using electric power of the battery unit 210 or external electric power. At this time, in order to reduce power consumption of the battery unit 210 or external power, the control unit 30 may use the heating water of the boiler unit 200 having a temperature greater than the second baseline. For example, the heating water of the boiler unit 200 may be directly fed to the reformer 100, and the control unit 30 may heat and vaporize the heating water fed to the reformer 100. As another example, the heating water of the boiler unit 200 may supply heat to the liquid water fed to the reformer 100 through a heat exchanger. In other words, since the control unit 30 operates the reformer 100 using the heat of the heating water of the boiler unit 200, power consumption occurring in the operation of the reformer 100 may be reduced, thereby improving efficiency.

In other words, when an amount of electric power in the battery unit 210 is equal to or less than the first baseline, the heating water temperature of the boiler unit 200 exceeds the second baseline, and the storage amount of the reformed fuel in the reformed fuel storage unit 110 is equal to or less than the third baseline, the control unit 30 may control the reformer 100 to be operated using the heating water of the boiler unit 200, and may provide the reformed fuel generated in the reformer 100 to the fuel cell stack 120. The control unit 30 may control the fuel cell stack 120 to be operated using the reformed fuel, and may supply electric power generated in the fuel cell stack 120 to the outside of the fuel cell system 1 (S211). Further, the control unit 30 may supply the heating water of the boiler unit 200 to the outside of the fuel cell system 1 (S212).

In some embodiments, even when the heating water temperature of the boiler unit 200 exceeds the second baseline, the control unit 30 may further heat the heating water using the heat generated during the operation of the fuel cell stack 120, and the heated heating water may be supplied to the outside of the fuel cell system 1. However, the embodiments are not limited thereto, and it is of course that the control unit 30 may supply the heating water of the boiler unit 200 to the outside of the fuel cell system 1 without additional heating of the heating water of the boiler unit 200.

When the heating water temperature of the boiler unit 200 is equal to or less than the second baseline (S207, N), the control unit 30 may determine whether the storage amount of the reformed fuel stored in the reformed fuel storage unit 110 exceeds the third baseline or not (S213).

When the storage amount of the reformed fuel in the reformed fuel storage unit 110 exceeds the third baseline (S213, Y), the control unit 30 may operate the fuel cell stack 120 using only the reformed fuel stored in the reformed fuel storage unit 110 without operating the reformer 100. In other words, the control unit 30 may control the operation to provide the reformed fuel stored in the reformed fuel storage unit 110 to the fuel cell stack 120 without operating the reformer 100. The control unit 30 may operate the fuel cell stack 120 to generate electric power, and may control the operation to provide the generated power to the outside of the fuel cell system 1 (S214). Further, the control unit 30 may control the operation to heat the heating water of the boiler unit 200 using the heat generated by the fuel cell stack 120, and may control the operation to provide the heated heating water to the outside of the fuel cell system 1 (S215).

When the storage amount of the reformed fuel in the reformed fuel storage unit 110 is equal to or less than the third baseline (S213, N), it may need to operate the reformer 100. The control unit 30 may control the operation of the reformer 100 to generate reformed fuel, and may control the fuel cell stack 120 to be operated using the generated reformed fuel. The fuel cell stack 120 may generate electric power and heat. The control unit 30 may control the operation to supply the power generated in the fuel cell stack 120 to the outside of the fuel cell system 1 (S216). Further, the control unit 30 may control the operation to heat the heating water of the boiler unit 200 using the heat generated in the fuel cell stack 120, and may control the operation to supply the heating water to the outside of the fuel cell system 1 (S217).

FIG. 3 is an exemplary view for explaining the operation of the fuel cell system 1 according to some embodiments of the present invention. Specifically, an operation of the fuel cell system 1 in the case where the supply of only electric power is requested from the outside of the fuel cell system 1 will be described with reference to FIGS. 1 and 3. For convenience of description, contents similar to or identical to those described above will be briefly described or omitted.

When the supply of electric power is requested from the outside of the fuel cell system 1 (S300), the control unit 30 may check whether the power stored in the battery unit 210 exceeds the first baseline (S301). When the power stored in the battery unit 210 exceeds the first baseline (S301, Y), the control unit 30 may supply the power stored in the battery unit 210 to the outside of the fuel cell system 1 (S302).

When the power stored in the battery unit 210 is equal to or less than the first baseline (S301, N), the control unit 30 may determine whether the storage amount of the reformed fuel stored in the reformed fuel storage unit 110 exceeds the third baseline or not (S302). When the storage amount of the reformed fuel stored in the reformed fuel storage unit 110 exceeds the third baseline (S302, Y), the control unit 30 may control the fuel cell stack 120 to be operated using the reformed fuel stored in the reformed fuel storage unit 110 without operating the reformer 100. Further, the control unit 30 may control the operation to supply the power generated by the fuel cell stack 120 to the outside of the fuel cell system 1 (S303).

When the storage amount of the reformed fuel stored in the reformed fuel storage unit 110 is equal to or less than the third baseline (S302, N), the control unit 30 may determine whether the heating water temperature of the boiler unit 200 exceeds the second baseline or not (S304). When the heating water temperature of the boiler unit 200 exceeds the second baseline (S304, Y), the control unit 30 may control the reformer 100 to be operated using the heating water of the boiler unit 200. The control unit 30 may control the fuel cell stack 120 to be operated using the reformed fuel generated by the reformer 100, and may supply the power generated from the fuel cell stack 120 to the outside of the fuel cell system 1 (S305).

When the heating water temperature of the boiler unit 200 is equal to or less than the second baseline (S304, N), the control unit 30 may control the reformer 100 to be operated, and may further control the operation to provide the reformed fuel generated in the reformer 100 to the fuel cell stack (120). The control unit 30 may control the fuel cell stack 120 to be operated using the reformed fuel generated in the reformer 100, and may supply the power generated in the fuel cell stack 120 to the outside of the fuel cell system 1 (S306).

FIG. 4 is an exemplary view for explaining the operation of the fuel cell system 1 according to some embodiments of the present invention. An operation of the fuel cell system 1 in the case where only heating is requested from the outside of the fuel cell system 1 will be described with reference to FIGS. 1 and 4. For convenience of description, contents similar to or identical to those described above will be briefly described or omitted.

When the provision of heating is requested from the outside of the fuel cell system 1 (S400), the control unit 30 may determine whether the heating water temperature of the boiler unit 200 exceeds the second baseline or not (S401). When the heating water temperature of the boiler unit 200 exceeds the second baseline (S401, Y), the control unit 30 may supply the heating water of the boiler unit 200 to the outside of the fuel cell system 1 (S402).

When the heating water temperature of the boiler unit 200 is equal to or less than the second baseline (S401, N), the control unit 30 may determine whether the amount of power of the battery unit 210 exceeds the first baseline or not (S403). When the amount of power of the battery unit 210 exceeds the first baseline (S403, Y), the control unit 30 may heat the heating water of the boiler unit 200 using the power of the battery unit 210, and may supply the heated heating water of the boiler unit 200 to the outside of the outside of the fuel cell system 1 (S404).

When the amount of power of the battery unit 210 is equal to or less than the first baseline (S403, N), the control unit 30 may check whether the storage amount of the reformed fuel in the reformed fuel storage unit 110 exceeds the third baseline or not (S405). When the storage amount of the reformed fuel in the reformed fuel storage unit 110 exceeds the third baseline (S405, Y), the control unit 30 may control the fuel cell stack 120 to be operated using the reformed fuel stored in the reformed fuel storage unit 110 without operating the reformer 100. At this time, the control unit 30 may control the battery unit 210 to be charged using the power generated in the fuel cell stack 120 (S406). Further, the control unit 30 may heat the heating water of the boiler unit 200 using heat generated in the fuel cell stack 120, and may control the operation to supply the heated heating water to the outside of the fuel cell system 1 (S407).

When the storage amount of the reformed fuel in the reformed fuel storage unit 110 is equal to or less than the third baseline (S405, N), the control unit 30 may control the reformer 100 to be operated. The control unit 30 may control the fuel cell stack 120 to be operated using the reformed fuel provided from the reformer 100. The control unit 30 may control the operation to store the power generated by the fuel cell stack 120 in the battery unit 210 (S408). Further, the control unit 30 may heat the heating water of the boiler unit 200 using heat generated from the fuel cell stack 120, and may supply the heated heating water to the outside of the fuel cell system 1 (S407).

FIG. 5 is an exemplary view for explaining the operation of the fuel cell system 1 according to some embodiments of the present invention. Normal operation of the fuel cell system 1 will be described with reference to FIGS. 1 and 5. For convenience of description, contents similar to or identical to those described above will be briefly described or omitted.

The control unit 30 may always check the heating water temperature of the boiler unit 200 and the storage amount of the reformed fuel storage unit 110. When the heating water temperature of the boiler unit 200 exceeds the second baseline and the stored amount of the reformed fuel in the reformed fuel storage unit 110 is equal to or less than the third baseline (S500), the control unit 30 may control the reformer 100 to be operated using the heating water of the boiler unit 200. Further, the control unit 30 may control the operation to store the reformed fuel generated in the reformer 100 in the reformed fuel storage unit 110 (S510).

As described above, according to some embodiments of the present invention, when the supply of electric power to the outside of the fuel cell system 1 is required and the amount of power of the battery unit 210 exceeds the first baseline, the control unit 30 may control the operation to supply the power stored in the battery unit 210 without operating the reformer 100 and the fuel cell stack 120.

According to some embodiments of the present invention, when the supply of electric power to the outside of the fuel cell system 1 is required, the amount of power in the battery unit 210 is equal to or less than the first baseline and the storage amount of the reformed fuel in the reformed fuel storage unit 110 exceeds the third baseline, the control unit 30 may control the fuel cell stack 120 to be operated using the reformed fuel stored in the reformed fuel storage unit 110 without operating the reformer 100.

According to some embodiments of the present invention, when the supply of electric power to the outside of the fuel cell system 1 is required, the amount of power of the battery unit 210 is equal to or less than the first baseline, the storage amount of the reformed fuel in the reformed fuel storage unit 110 is equal to or less than the third baseline, and the heating water temperature of the boiler unit 200 exceeds the second baseline, the control unit 30 may control the reformer 100 to be operated using the heating water of the boiler unit 200.

According to some embodiments of the present disclosure, when the provision of heating to the outside of the fuel cell system 1 is required and the heating water temperature of the boiler unit 200 exceeds the second baseline, the control unit 30 may supply the heating water of the boiler unit 200 to the outside of the fuel cell system 1 without operating the reformer 100 and the fuel cell stack 120.

According to some embodiments of the present disclosure, when the provision of heating to the outside of the fuel cell system 1 is required, the amount of power of the battery unit 210 exceeds the first baseline, and the heating water temperature of the boiler unit 200 is equal to or less than the second baseline, the control unit 30 may heat the heating water of the boiler unit 200 using the power stored in the battery unit 210 without operating the fuel cell stack 120.

According to some embodiments of the present invention, the control unit 30 always checks the heating water temperature of the boiler unit 200 and the reformed fuel storage amount of the reformed fuel storage unit 110 and, when the heating water temperature of the boiler unit 200 exceeds the second baseline and the storage amount of the reformed fuel in the reformed fuel storage unit 110 is equal to or less than the third baseline, the control unit 30 may control the reformer 100 to be operated using the heating water of the boiler unit 200.

FIG. 6 is an exemplary view for explaining the fuel cell system 2 according to some other embodiments of the present invention. For convenience of description, the same or similar contents to those described above will be omitted or simply described.

The control unit 30 of a fuel cell system 2 according to some embodiments of the present invention may include a bidirectional Advanced Metering Infrastructure (AMI) 310. The control unit 30 may provide information such as used electric power to the outside through the bidirectional AMI 310, and may receive information such as fuel rate and electricity rate (or bill) from the outside.

The fuel cell system 2 according to some embodiments of the present invention may be connected to an external device 3 through a network. According to some embodiments, the external device 3 may monitor whether the control of the control unit 30 is appropriate or the like. Further, when the fuel cell system 2 malfunctions, the external device 3 may control the control unit 30 through a remote control or the like. Further, the external device 3 may receive operation information on the fuel cell system 2, etc., and may make it into a database to improve the function and efficiency of the control unit 30 and update the same. Further, the establisher of the fuel cell system 2 may operate an energy saving program reflecting electricity and fuel rates through the external device 3.

FIGS. 7 and 8 are exemplary views for explaining an operating method of the fuel cell system 2 according to some embodiments of the present invention. The operating method of the fuel cell system 2 will be described with reference to FIGS. 6, 7 and 8. For convenience of description, contents similar to or identical to those described above will be briefly described or omitted.

FIGS. 6 and 7, the bidirectional AMI 310 of the control unit 30 may receive electricity bill information (S700). When the electricity rate is less than a fourth baseline (S701, Y), the control unit 30 may check whether the amount of power stored in the battery unit 210 is greater than the first baseline or not (S702). When the amount of power of the battery unit 210 is greater than the first baseline (S702, Y), the control unit 30 may perform general control operations (S703). The general control operation refers to an operation of the fuel cell system described above with reference to FIGS. 1 to 5. The fourth baseline may be determined with reference to cost incurred when the fuel cell stack 120 operates.

When the amount of power of the battery unit 210 is equal to or less than the first baseline (S702, N), the control unit 30 may purchase electric power from the outside of the fuel cell system 2. The control unit 30 may control the operation to store the electric power purchased from the outside of the fuel cell system 2 in the battery unit 210 (S704).

When the electricity rate is equal to or greater than the fourth baseline (S701, N), the control unit 30 may check whether the electricity rate is greater than a fifth baseline or not (S705). When the electricity rate is equal to or less than the fifth baseline (S705, N), the control unit 30 may perform general control operations (S703). A fifth baseline may be determined with reference to a cost incurred when the fuel cell stack 120 operates. The fourth baseline and the fifth baseline may be the same as or different from each other.

When the electricity rate is greater than the fifth baseline (S705, Y), the control unit 30 may control the fuel cell stack 120 to be operated (S706). The control unit 30 may sell the electric power by controlling the power generated by the fuel cell stack 120 to be supplied to the outside of the fuel cell system 2 (S707).

Referring to FIGS. 6 and 8, the control unit 30 may determine the amount of power of the battery unit 210 and whether the fuel cell stack 120 is operating or not. When the amount of power of the battery unit 210 is greater than the first baseline but continuous operation of the fuel cell stack 120 is required (S800), the control unit 30 may supply the power generated by the fuel cell stack 120 to the outside and sell the same (S801). For example, when electric power can no longer be stored in the battery unit 210 due to the continuous operation of the fuel cell stack 120, the control unit 30 may sell the power generated by the fuel cell stack 120.

As described above, according to some embodiments of the present invention, the fuel cell system 2 may establish an electric power trading strategy based on the electricity rate information received from the bidirectional AMI 310. In other words, when the electricity rate is lower than the cost required for power generation through the fuel cell system 2, the control unit 30 may control the operation to purchase power and store it in the battery unit 210. Further, when the electricity rate is higher than the cost required for power generation through the fuel cell system 2, the control unit 30 may control the fuel cell stack 120 to be operated, thereby selling electric power.

According to some embodiments of the present invention, when there is no more space to store power in the battery unit 210 but the fuel cell stack 120 operates to generate power, the control unit 30 may sell the power generated in the fuel cell stack 120 to the outside of the fuel cell system 2.

Although the embodiments of the present invention have been described above with reference to the accompanying drawings, the present invention is not limited to the above embodiments but may be manufactured in various different forms. Further, those skill in the art to which the present invention pertains will understand that the present invention may be embodied in other specific forms without changing the spirit or essential features of the present invention. Therefore, it should be understood that the embodiments described above are illustrative in all respects and not restrictive.

The invention claimed is:

1. A fuel cell system, comprising:

a reformer for reforming fuel into a reformed fuel;

a reformed fuel storage unit configured to receive and store the reformed fuel from the reformer;

a fuel cell stack configured to generate electric power and heat using the reformed fuel;

a boiler unit configured to provide heating using the heating water;

a battery unit that stores the electric power generated from the fuel cell stack; and a control unit that controls operation of the reformer, the reformer fuel storage unit, the fuel cell stack, the boiler unit and the battery unit, wherein the control unit is configured to control the reformer such that the reformer is operated using the heating water in the boiler unit in a case where a temperature of the heating water in the boiler unit is higher than a first baseline and a storage amount of the reformed fuel in the reformed fuel storage unit is equal to or less than a second baseline, wherein the control unit is configured to control heating of the heating water in the boiler unit using the power stored in the battery unit in a case where the provision of heating the outside is required, a temperature of the heating water in the boiler unit is equal to or less than the first baseline, and the amount of power in the battery unit is greater than a third baseline, and wherein the control unit is configured to control the reformer and the fuel cell stack such that the reformer and the fuel cell stack are operated independently of each other.

2. The system according to claim 1, wherein, when the supply of electric power to the outside is required, the storage amount of the reformed fuel in the reformed fuel storage unit is equal to or less than the second baseline, and an amount of electric power in the battery unit is equal to or less than a third baseline, the control unit controls the reformer to be operated in order to generate reformed fuel, and further controls the fuel cell stack to be operated using the reformed fuel.

3. The system according to claim 1, wherein, when the supply of electric power to the outside is required, the storage amount of the reformed fuel in the reformed fuel storage unit is greater than the second baseline, and the amount of electric power in the battery unit is equal to or less than the third baseline, the control unit controls the reformer to be inoperative and further controls the fuel cell stack to be operated using the reformed fuel stored in the reformed fuel storage unit.

4. The system according to claim 1, wherein, when the supply of electric power to the outside is required and the amount of electric power in the battery unit is greater than the third baseline, the control unit controls the power stored in the battery unit to be supplied the outside.

5. A fuel cell system, comprising:

a reformer for reforming fuel into a reformed fuel;

a reformed fuel storage unit configured to receive and store the reformed fuel from the reformer;

a fuel cell stack configured to generate electric power and heat using the reformed fuel;

a boiler unit configured to provide heating using the heating water;

a battery unit that stores the electric power generated from the fuel cell stack; and a control unit that controls operation of the reformer, the reformer fuel storage unit, the fuel cell stack, the boiler unit and the battery unit, wherein the control unit is configured to control the reformer such that the reformer is operated using the heating water in the boiler unit in a case where a temperature of the heating water in the boiler unit is higher than a first baseline and a storage amount of the reformed fuel in the reformed fuel storage unit is equal to or less than a second baseline, wherein the control unit is configured to control the operation of the fuel cell stack and further control heating of the heating water in the boiler unit using heat generated in the fuel cell stack in a case where the provision of heating of the outside is required, a temperature of the heating water in the boiler unit is equal to or less than the first baseline, and the amount of powder in the battery unit is equal to or less than a third baseline, and wherein the control unit is configured to control the reformer and the fuel cell stack such that the reformer and the cell stack are operated independently of each other.

6. The system according to claim 5, wherein, when the storage amount of the reformed fuel in the reformed fuel storage unit is equal to or less than the second baseline, the control unit controls the reformer to be operated.

7. The system according to claim 5, wherein, when the storage amount of the reformed fuel in the reformed fuel storage unit is greater than the second baseline, the control unit controls the reformer to be inoperative and further controls the fuel cell stack to be operated using the reformed fuel stored in the reformed fuel storage unit.

8. The system according to claim 1, wherein the control unit includes a bidirectional Advanced Metering Infrastructure (AMI) and, when an electricity rate (electric charge) received through the bidirectional AMI is greater than a fourth baseline, the control unit controls the fuel cell stack to be operated and further controls the operation to supply the power generated in the fuel cell stack to the outside.

9. The system according to claim 1, wherein the control unit includes a bidirectional Advanced metering infrastructure (AMI) and, when an electricity rate received through the bidirectional AMI is equal to or less than a fifth baseline, the control unit controls the operation to receive power supplied from the outside and then storage thereof in the battery unit.

10. The system according to claim 1, wherein, when the power of the battery unit is greater than the third baseline and the fuel cell stack is operating, the control unit controls the operation to supply the power generated by the fuel cell stack to the outside.

* * * * *